United States Patent [19]

Molitor

[11] 4,313,491

[45] Feb. 2, 1982

[54] COILED HEAT EXCHANGER

[75] Inventor: Victor D. Molitor, Denver, Colo.

[73] Assignee: Molitor Industries, Inc., Englewood, Colo.

[21] Appl. No.: 122,305

[22] Filed: Feb. 19, 1980

Related U.S. Application Data

[62] Division of Ser. No. 920,660, Jun. 30, 1978, abandoned.

[51] Int. Cl.³ .......................... F28F 9/22; F28D 7/02; F28D 7/04
[52] U.S. Cl. ...................................... 165/83; 165/160; 165/163; 165/174
[58] Field of Search ............... 165/163, 165, 160, 174, 165/81–83

[56] References Cited

U.S. PATENT DOCUMENTS

| | | | |
|---|---|---|---|
| 1,840,940 | 1/1932 | Ecabert | 165/163 |
| 2,050,465 | 8/1936 | Salvo et al. | 165/163 |
| 3,130,779 | 4/1964 | Huet | 165/163 |
| 3,474,636 | 10/1969 | Bligh | 165/160 |
| 3,516,483 | 6/1970 | Benteler et al. | 165/174 X |
| 3,526,273 | 9/1970 | Wentworth, Jr. | 165/163 |
| 4,084,546 | 4/1978 | Schneeberger et al. | 165/163 |

FOREIGN PATENT DOCUMENTS

| | | | |
|---|---|---|---|
| 2349949 | 7/1974 | Fed. Rep. of Germany | 165/163 |
| 791843 | 3/1958 | United Kingdom | 165/163 |
| 1163805 | 9/1969 | United Kingdom | 165/163 |

Primary Examiner—Sheldon J. Richter
Attorney, Agent, or Firm—Horace B. Van Valkenburgh

[57] ABSTRACT

A series of tubes wound in spiral, spaced relation in pressure contact with the next inner tube or a central cylinder to form, between them, a spiral path for one liquid flowing upwardly in the space between the tubes, while another liquid flows downwardly in the tubes. The outermost tube may be enclosed by a sheath in pressure contact therewith, while several sets of tubes, separated by corresponding sheaths, may be utilized. The diameter of the tubes may be varied for the sets to compensate for the greater length of tubes at an outer position, so that an approximately equal time of travel from one end of the tubes to the opposite ends may be obtained. The spacing between the successive turns of the coils is preferably a distance corresponding to one half the diameter of the tubes.

3 Claims, 3 Drawing Figures

COILED HEAT EXCHANGER

This invention relates to heat exchangers. This application is a division of my copending application Ser. No. 920,660 filed June 30, 1978, now abandoned.

BACKGROUND OF THE INVENTION

Prior heat exchangers have had various features. Thus, U.S. Pat. No. 1,789,733 discloses a heat exchanger for cooling water in which a series of four coils spiral upwardly in a spaced, rectangular configuration from a lower header to an upper header, while brine or other liquid is fed into a tank in which the coils are installed through nozzles located on a central standpipe. The refrigerant is introduced into the lower header in liquid form and forms a gas during upward passage in the coils. U.S. Pat. No. 2,241,186 discloses a liquid cooler including a tank for a fluid refrigerant, such as freon, ammonia, carbon dioxide, etc., and coils inside the tank formed from tubes of increasing diameter, joined end to end, in three sets. The smallest tubes are each wound in three interposed coils, each forming a pair of concentric inner coils spiralling in opposite directions and connected at one end. A set of three interposed, concentric pairs of intermediate coils are connected at one end to the outer of the corresponding smaller coils and at the opposite end of each other, while three interposed outer coils are of still larger size, are connected to the outermost intermediate coils and spiral in the opposite direction. The purpose of the increase in the size of the coils is to prevent a liquid, such as water, from freezing while being cooled to below its freezing point. The flow of water is in both directions with respect to the horizontal, longitudinal axis of the tank, while the flow of refrigerant is essentially vaporization in the lower portion of the tank and withdrawal of vapor at the top. Also, the coils are spaced apart by longitudinal rods. U.S. Pat. No. 2,530,519 discloses a cooker in which a pair of concentric coils, one within the other but separated by circumferentially spaced rods, extend upwardly from a common lower header to a common upper header. U.S. Pat. No. 3,639,963 discloses a method of making a heat exchanger and coil assembly in which the coil turns are arranged in concentric layers, are spaced apart by spacer members and are secured together by dip soldering. The coils are formed from one continuous tube which alternates in going from an inner coil to the outer coil at the top and bottom, respectively. U.S. Pat. No. 3,738,842 discloses a heat exchanger for cooling water in which a refrigerant tubing is flattened against the exterior of a tank to form a spiral coil and a water tube extends spirally around the outside of the flattened refrigerant tube, then connects with the inside of the tank at the bottom. U.S. Pat. No. 3,921,708 discloses a heat exchanger having a single coil spiralling about a central tube, with a spiral ribbon interspaced between turns. The wall of the tube is corrugated to permit expansion and contraction. U.S. Pat. No. 4,036,621 discloses a beverage dispenser in which concentric coils are located in spaced arrangement inside a tank, i.e. one inner coil and two spaced apart outer coils. Also, heat conducting rods extend axially from the inside to the outside of the turns of the inner coil. U.S. Pat. No. 4,061,184 discloses a heat exchanger for a refrigerated water cooler in which a refrigerant circulating coil is wound about the outside of a tank, while the water to be cooled is fed into the upper portion of the tank. A cylinder having an open top and a closed bottom, except for a relief valve, is spaced inwardly from the tank side wall, while a coil extends spirally in the space between the cylinder and the tank. This coil has an open bottom turn but an inlet spaced above the water inlet, for overflow into the inlet and movement of water down the coil when the water reaches such an upper level.

None of the above heat exchangers provide the distinguishing features or combination of features of the heat exchangers of the present invention.

SUMMARY OF THE INVENTION

A heat exchanger of this invention includes an inlet for a liquid to or from which heat is to be transferred, and one or more series of concentric, spiral coils through which this liquid is passed, as from top to bottom when this liquid is to transfer heat to another liquid. The coils are wound about a central cylinder in laterally abutting and pressurized relation, such as to slightly flatten the coil turns, to form a seal so that the liquid outside the coils is forced to move in a spiral path between the coil turns. These coils may be formed from essentially the same diameter tubing and have progressively increasing diameters of turns, with a sheath pressing against and covering the outside of the coils. A crimp may be placed in the inlet end of one or more of the tubes to restrict the flow, as in accordance with the length of the paths which the liquid will travel through the respective coil. Or several series of coils, such as three coils in each series, may be wound in laterally abutting and preferably pressurized relation, with a sheath surrounding each series of coils. Such sheaths have a dual function, i.e. to seal the spiral passage between one set of coils from the passage between the next outer set of coils and to provide a mandrel on which the next outer set of coils may be wound. Each series of coils may be formed of tubing of the same diameter, but the diameter of the tubing may increase as the series progress outwardly. The outermost coil may be enclosed by a circular sheath which has outwardly offset ends which may be attached to the inside of a cylinder, the ends of which are provided with tube sheets through which the coil tubes extend, with a sleeve for each which is welded, soldered, brazed or otherwise attached to the respective tube and the tube sheet. Inlet and outlet headers are formed between the tube sheets and the end caps for the outer cylinder, while an outside shell and end caps may produce a space in which insulation is placed. Inlet and outlet pipes for the opposing liquid may be connected to the inside of the outer cylinder, inside the tube sheets.

THE DRAWINGS

The foregoing features, as well as additional features, will become apparent from the following description taken in conjunction with the accompanying drawings, in which.

DESCRIPTION OF PREFERRED EMBODIMENTS

Figure 1:
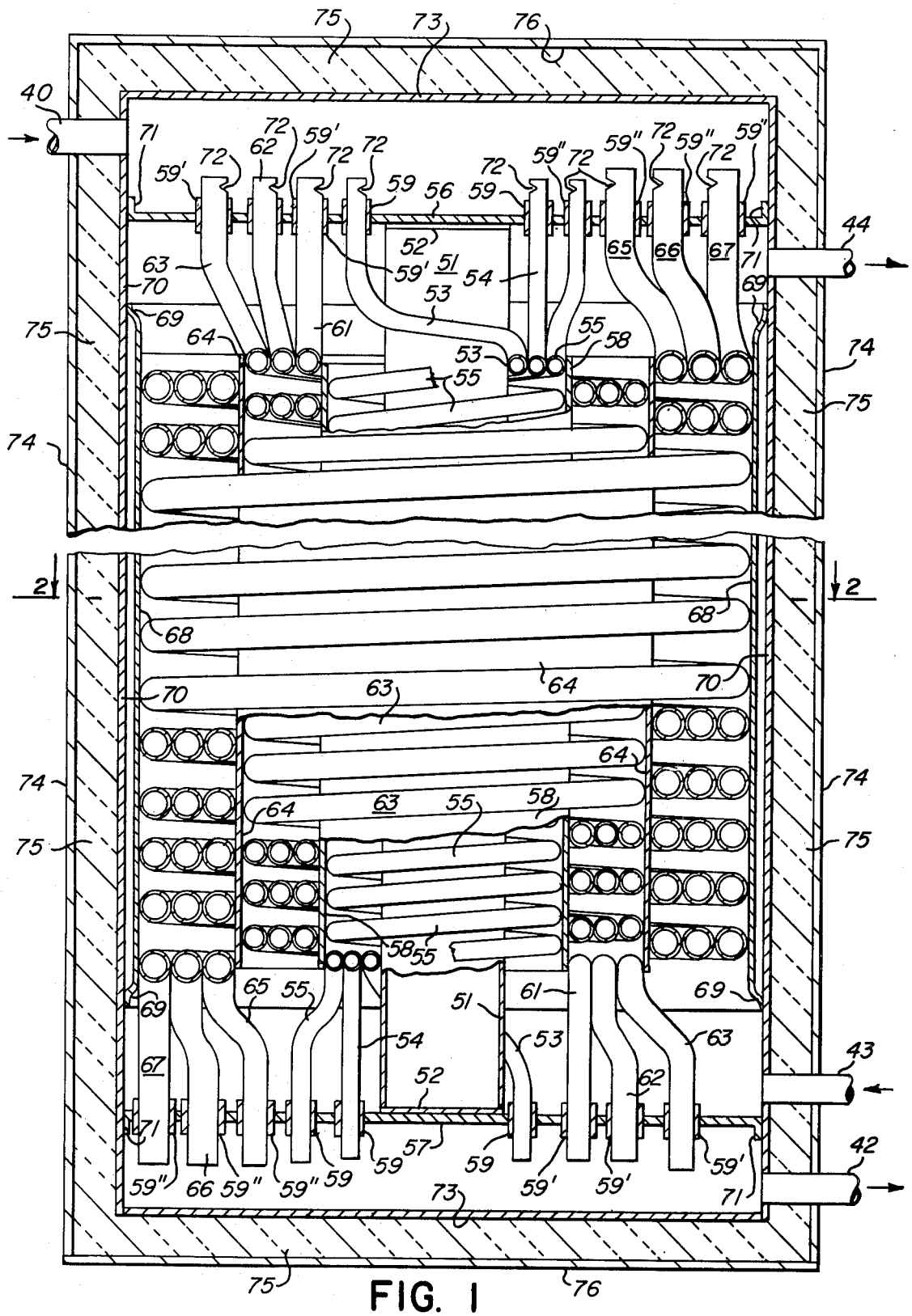
FIG. 1 is a condensed vertical section of a heat exchanger of this invention.

The preferred construction of a heat exchanger of this invention is illustrated in FIG. 1, although several variations are possible, as will be described later. The heat exchanger of FIG. 1 is provided with an inner cylinder 51 having end caps 52, essentially providing a form about which several series of coils, such as three, may be wound. Thus, tubes 53, 54 and 55 are wound about the inner cylinder 51 and about each other in lateral alignment and with lateral pressure, such as sufficient that the inner tube 53 will be slightly flattened against inner cylinder 51 and each of tubes 54 and 55 slightly flattened at the area of abutment with the adjacent tube, along the coils, to assist in sealing the spiral area between turns of the coils. The coil turns are preferably spaced apart a substantially uniform distance, such as one half the diameter of the tubes, and in any event, preferably such that the volume of the area between the three coils, as they spiral around the inner cylinder, is about twice the combined cross sectional area inside the tubes, so that a greater volume of a first liquid, such as water, to be heated will pass through the spiral space between the coils as a hot or warm second liquid, such as water, will pass through the coils in counter-current flow. Thus, the second liquid is preferably introduced at the top of the heat exchanger through pipe 40 for flow downwardly through the coils of tubes 53–55 and discharged through outlet 32 at the bottom of the heat exchanger, while the first liquid to be heated may be introduced through inlet pipe 43 adjacent the bottom of the heat exchanger, for flow into and through the spiral paths between the coils and upwardly for discharge through pipe 44. The upper ends of tubes 53–55 may extend through a circular tube sheet 56 and the lower ends through a circular tube sheet 57, between which the central cylinder 51 extends. The inner set of coils formed by tubes 53–55 is enclosed by a sheath 58 which may be a rectangular plate rolled to a cylindrical form and slipped over the tube coils, then compressed against the coils and the abutting edges welded to insure that the coils remain in position. A sleeve 59 for each tube and installed in each of the tube sheets 56 and 57 may be welded or brazed to the sheet and provides a sealing position for each of the tubes, to which the respective tubes may be welded or soldered after extension through the corresponding sleeve. During winding, individual coils may be attached together and prevented from uncoiling in any suitable manner, such as by adhesive, solder or weld. Connections 60 of FIG. 2, which are successively placed at suitable positions, such as one third of a turn apart, may attach the turns of tube 53 to inner cylinder 51 as the inside coil is wound, then may attach the turns of tube 54 as its coil is wound to the corresponding turns of tube 53, and similarly may attach the turns of tube 55 as its coil is wound to the corresponding turns of tube 54. After sheath 58 is installed, no solder or welds normally can be produced to attach sheath 58 to the turns of tube 55, except as the abutting edges of the sheath are welded to the turns, due to the coils being inside the sheath.

Surrounding the sheath 58 may be an intermediate set of coils formed by tubes 61, 62 and 63, with the innermost intermediate tube 61 wound as a coil about the sheath 58, and the tubes 62 and 63, in succession, wound about the tube 61 in laterally abutting relation, as with sufficient pressure to slightly flatten the tubes. The coil turns are preferably spaced apart as uniformly as possible to provide a spiral channel, preferably having a cross sectional area approximately twice the combined cross sectional area inside the tubes, so that approximately twice the volume of liquid will flow outside as inside the tubes. Again, the coils may be secured or attached together, as by adhesive, solder or weld connections 60 of FIG. 2, spaced around the turns and attaching the coil of tube 61 to sheath 58, the coil of tube 62 to tube 61 and the coil of tube 63 to tube 62, as each coil is wound. The upper ends of the tubes extend through tube sheet 56, and the lower ends of the tubes extend through tube sheet 57. The tubes extend through a series of sleeves 59' welded or otherwise attached to the sheets 56 and 57 in a fluid tight manner, with the tubes also attached to the sleeves in a fluid tight manner. The tubes 61–63 are conveniently larger in diameter than the tubes 53–55 because they are longer, due to the greater diameter of the coils and the fluid passing therethrough must follow a longer path. An intermediate sheath 64, such as formed from a rectangular sheet, is similarly wrapped with pressure around the coils formed by tubes 61–63 and its abutting edges welded along a longitudinal line axially of the coils. The spiral path which the liquid flowing between the coils is required to take, insures a greater retention time and a longer opportunity for heat transfer. The coils, of course, force the liquid from which heat is to be transferred also to follow a spiral path, countercurrent to the spiral path of the liquid to be heated. Due not only to the lateral compression of the coils against each other, but also the lateral compression of the coil formed from tube 60 against the inner sheath 58 and the lateral compression of the sleeve 64 against the outer coil of this set formed by tube 63, the liquid is constrained to follow the desired path.

Figure 2:
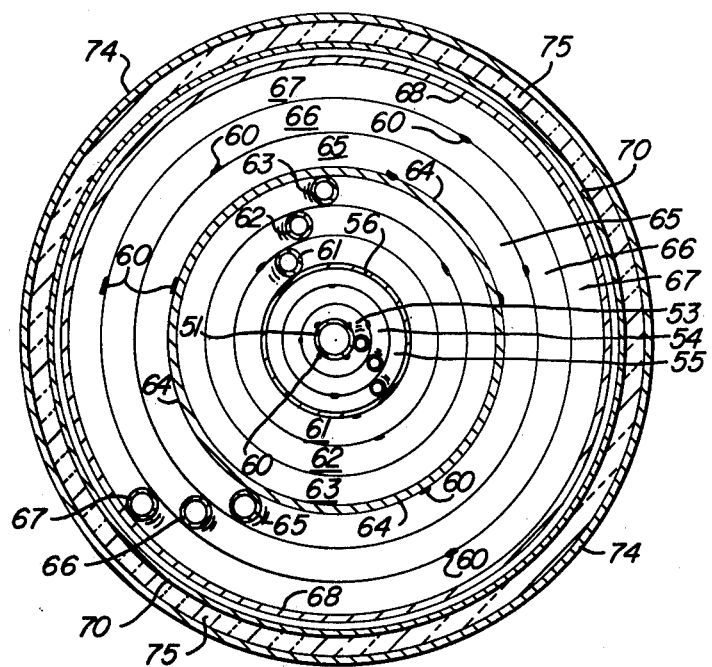
FIG. 2 is a horizontal cross section on a slightly reduced scale, taken along line 2—2 of FIG. 1.

An outer set of coils of still larger diameter, again laterally compressed against each other and against the intermediate sleeve 64, is wound about sleeve 64 from tubes 65, 66 and 67, while the coil turns may be attached to intermediate sheath 64 and the coil turns of the preceding tube, respectively, as the coils are wound, as by adhesive, solder or weld connections 60 of FIG. 2. As before, a sheath 68 is wrapped with pressure around the outside of the coils formed by tubes 65–67 and the abutting edges again welded. However, sleeve 68 is formed with an outward offset 69 at each end, for attachment to a cylinder 70, so that the space between outer sheath 68 and cylinder 70 will permit lateral expansion of the coils and sheaths, since the temperature within the heat exchanger may vary due to periods of heating and nonheating. The respective ends of each outer tube 65, 66 and 67 extend through a sleeve 59", which is again attached in a fluid tight manner to the respective tube sheet 56 or 57, through which it extends, while each tube is attached in a fluid tight manner to the respective sleeve. When the tubes and tube sheets are of copper, for instance, and the sleeves are of stainless steel, welding is a normal method for fluid tight attachment. However, with other types of metals, soldering or other suitable processes may be utilized. The sleeves 59, 59', 59" will be of different size and often of different lengths, due to the difference in diameter of the tubes which pass through the respective sleeves. Conveniently, the inner cylinder 51, the coils formed by inner tubes 53–55, the inner sheath 58, the coils formed by intermediate tubes 61–63, the intermediate sheath 64, the coils formed by outer tubes 65–67 and the outer sheath 68 are assembled, then cylinder 70 is slipped over the assembly and the offset ends of sheath 68 welded to the inside of cylinder 70. Then the tube sheets 56 and 57, with the respective sleeves 59, 59' and 59" attached, are placed in position as the previously positioned ends of the respective tubes are slipped into the respective sleeves, after which the periphery of the plates 56 and 57 may be welded to the inside of cylinder 70, as at the axially turned edges 71. Then the ends of the tubes may be welded or otherwise suitably attached to the sleeves. Prior to or after attachment to the sleeves, a series of crimps 72 may be placed in the inlet ends of the tubes to control the flow through the respective tube, so that the rate of flow through each of the tubes will be essentially equalized. In general, this will require crimps in the pipes which will proportion the flow in accordance with the surface area of the respective tube which is exposed to the liquid in the spiral paths, in general proportioned to the diameter of the tube and the length of spiral of the respective coil. The ends of the tubes are shown in FIG. 1 as passing through the tube sheet on opposite sides of central cylinder 51 and the sleeves 59, 59' and 59" are conveniently in a straight line to facilitate punching the holes for the sleeves. This straight line may be offset from the cylinder 51 to provide a greater clearance around each sleeve. Also, while the tubes are shown in FIG. 1 as extending from the respective coils along an essentially straight line, for clarity of illustration, an arrangement such as shown in FIG. 2 may be utilized, at each end of the coils. Thus, the inner tubes 53-55, the intermediate tubes 61-63 and the outer tubes 65-67 may emanate or join the coils at different circumferential positions, such as approximately 120° apart, to provide as much working room as possible for bending the tubes away from the respective coils. In addition, each outer tube of each series should extend from the last coil at a position ahead of the adjacent inner tube, i.e. the innermost tube is bent away from the coil at a desired position, then the coil of each subsequent tube is extended past the preceding tube before being bent away from its coil, to minimize interference by a tube previously bent away from its coil.

End caps 73 for cylinder 70 provide headers or spaces, such as into which a first liquid may flow from inlet 40 between upper end cap 73 and the upper tube sheet 56, and a similar space between tube sheet 57 and lower end cap 73 for discharge through outlet 42. As will be evident, a second liquid from pipe 43 will pass into the space between lower tube sheet 57 and follow a spiral path along the exterior of the coils, while the second liquid will flow from the spiral passages into an upper space between the coils and the tube sheet 56 for discharge through outlet 44. Suitable fittings at appropriate holes in cylinder 70 may be provided, so that pipes 40, 42, 43 and 44 may be connected to the respective fittings when inserted through apertures in a cylindrical outer shell 74 which is placed around or over the previous assembly, to provide space for insulation 75 which also fills the space between end caps 73 of cylinder 70 and end caps 76 for the outer shell 74. Or, suitable stub pipes for pipes 40, 42, 43 and 44 may be welded to cylinder 70 at appropriately placed holes, so that the inlet and outlet pipes may be attached, as by welding, to the stub pipes after the shell 74 has been installed. It will be noted that the outer shell is not subject to fluid pressure.

Figure 3:
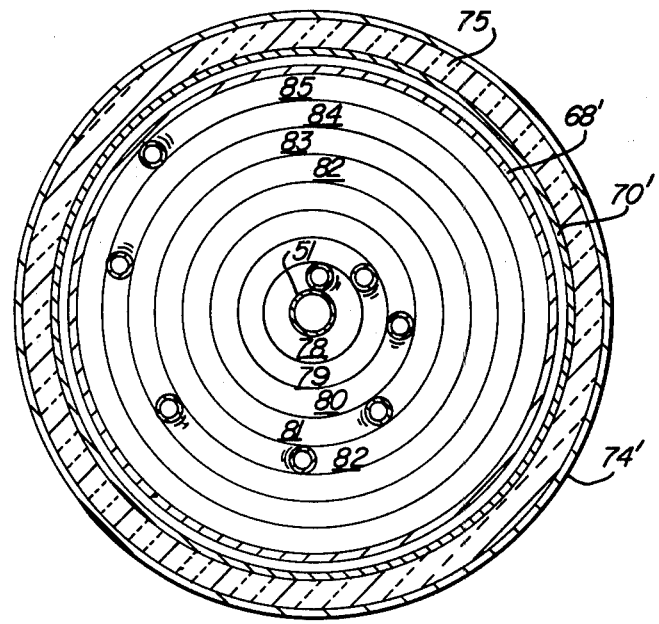
FIG. 3 is a cross section similar to FIG. 2, but showing an alternative heat exchanger construction.

The alternative heat exchanger illustrated in FIG. 3 includes a series of coils formed from tubing of the same diameter but wound in laterally abutting, pressurized relation about a central cylinder 51. The coils formed by tubes 78, 79, 80, 81 82, 83, 84 and 85 are wound and may be attached together, if desired, in a manner similar to each of the sets of coils of the heat exchanger of FIGS. 1 and 2, while all of the coils may be enclosed by an outer sheath 68' which provides an expansion space between the sheath 68' and a cylinder 70'. The tubes which extend from the opposite ends of the coils of FIG. 3 may extend to tube sheets similar to those of FIG. 1 and through sleeves attached in a fluid tight manner to the tube sheets, with the extending end of each tube also attached in a fluid tight manner to the corresponding sleeve. Again, some means of regulating the flow through the respective coils, such as similar to crimps 72, may be adopted to compensate for the difference in the length of the path of the fluid passing through the respective coils. Nevertheless, when so wound, the coils form a spiral passage between them which again desirably has a cross sectional area of about twice the total cross sectional area of the adjacent tubes. The outer sheath 68' may also have offset ends attached, as by welding, to the cylinder 70', with insulation 75 placed in the annular area between the cylinder 70' and an outer shell 74'. As before, suitable inlet and outlet pipes may be connected to the cylinder 70', with both cylinder 70' and outer shell 74' being closed by suitable end caps. Conveniently, the tubes, when proceeding longitudinally from the respective coils, may extend initially in a spiral fashion, as illustrated in FIG. 3, with the innermost tube 78 being bent in a longitudinal direction at a predetermined position, and each remaining tube 79-85 being bent in a position ahead of the next innermost tube, so that a previously bent tube will not interfere with the bending of the next tube.

Conveniently, the bending positions of the tubes may be spaced apart at a substantially equal angle, so that when all of the tubes have been bent up, a full 360° will be covered. Thus, with eight tubes, as illustrated in FIG. 3, the bending positions of the tubes may be 45° apart. Of course, any other suitable angular relationship may be utilized. One advantage of the heat exchanger of FIG. 3 is that it may be found to be more economical to construct, since one size of tubing is used and only one outer sheath is applied to the tubes.

Although more than one embodiment of a heat exchanger of this invention has been illustrated and described, it will be understood that other embodiments may exist. It will be further understood that various changes may be made in the heat exchangers, without departing from the spirit and scope of this invention.

What is claimed is:

1. A heat exchanger comprising:
   a central cylinder;
   a tube forming a spiral coil in pressure contact with said central cylinder;
   a series of additional tubes forming spiral coils in lateral relation to and having essentially the same spiral as said first coil, the turns of each coil being in pressure contact with the turns of the next inner coil;
   a sheath in pressure contact with the outermost coil, whereby a spiral path provides for flow of a liquid between said coil turns from one end of said coils to the other, and whereby said liquid follows an elongated path corresponding to the path of travel of said liquid within said coils;

means for supplying a first liquid to one end of each tube;

means for withdrawing said first liquid from the opposite end of each said tube;

means for supplying a second liquid to the spiral path between turns of said coils, at one end of said coils;

means for withdrawing said second liquid from said spiral path at the opposite end of said coils;

an outward offset at each end of said sheath; and an outer cylinder to which said offsets are attached, the space between said sheath and said outer cylinder permitting lateral expansion of said coils and sheath.

2. A heat exchanger comprising:

a central cylinder;

a tube forming a spiral coil in pressure contact with said central cylinder;

a series of additional tubes forming spiral coils in lateral relation to and having essentially the same spiral as said first coil, the turns of each coil being in pressure contact with the turns of the next inner coil;

a sheath in pressure contact with the outermost coil, whereby a spiral path provides for flow of a liquid between said coil turns from one end of said coils to the other, and whereby said liquid follows an elongated path corresponding to the path of travel of said liquid within said coils;

a plurality of similarly formed, concentric series of coils, each series being formed from a plurality of tubes and the turns of the coils of each series being in internally abutting, pressure engaging relation;

a sheath enclosing and in pressure engagement with the outermost coil of each series;

means for supplying a first liquid to one end of each tube;

means for withdrawing said first liquid from the opposite end of each said tube;

means for supplying a second liquid to the spiral path between said coils, at one end of each said series of coils; and means for withdrawing said second liquid from said spiral path at the opposite end of each said series of coils.

3. A heat exchanger as defined in claim 2, wherein:

the tubes forming the coils of each series have the same size; and the tubes forming the coils of the different series have increasing sizes, from the inner series to the outer series.

* * * * *